United States Patent Office 3,102,879
Patented Sept. 3, 1963

3,102,879
PRODUCTION OF CATIONIC DYESTUFFS
Hans Baumann and Johannes Dehnert, Ludwigshafen
(Rhine), Germany, assignors to Badische Anilin- &
Soda-Fabrik Aktiengesellschaft, Ludwigshafen (Rhine),
Germany
No Drawing. Filed June 22, 1959, Ser. No. 821,644
Claims priority, application Germany Sept. 30, 1958
6 Claims. (Cl. 260—157)

This invention relates to new cationic dyestuffs and especially it relates to dyestuffs the cation of which contains an imidazole ring on the one hand and a benzene or naphthalene ring or an azobenzene radical on the other hand, to their production and their use.

We have found that a group of valuable dyestuffs are those which contain cations of the general formula

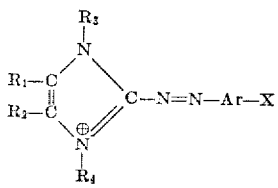

in which $R_1$ and $R_2$ each represents a hydrogen atom or an alkyl, cycloalkyl, aralkyl or aryl radical or both are members of a common non-aromatic isocyclic or heterocyclic ring, $R_3$ and $R_4$ each is an alkyl, cycloalkyl or aralkyl group, Ar represents an ortho-phenylene, para-phenylene, ortho-naphthylene or para-naphthylene group or the divalent radical of 4,4'-azobenzene, and X is a halogen atom, an alkoxy, alkylthiol, sulfonic acid, alkylsulfonic or arylsulfonic acid ester group or a radical of the general formula

in which $R_5$ represents a hydrogen atom, a free or substituted alkyl, cycloalkyl or aralkyl group, $R_6$ is a free or substituted alkyl, cycloalkyl, aralkyl or aryl group or $R_5$ and $R_6$ both are members of a common heterocyclic ring.

These dyestuffs, of which the anions may be any inorganic or organic colorless anions and of which the rings may contain substantially neutral substituents atoms conventional in dyestuff chemistry, as for example halogen, alkyl, aralkyl, hydroxyl, alkoxyl, nitro, cyano, primary, secondary or tertiary amino, acylamino, alkylsulfone, arylsulfone, carboxylic acid, carboxylic acid ester and or possibly substituted carboxylic acid amide, sulfonic acid amide or arylazo groups, may be obtained by the following methods of preparation:

(A) Aromatic amino compounds of the general formula

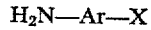

H$_2$N—Ar—X in which Ar and X have the meanings given above are diazotized and coupled with imidazoles of the general formula

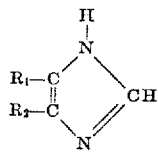

in which $R_1$ and $R_2$ have the meanings given above. Naturally it is also possible to prepare disazo dyestuffs by tetrazotizing aromatic diamines, derived for example from diphenyl, stilbene, diphenyl ether, diphenyl sulfide or diphenylamine, and coupling with two molecules of the said azo components. The diazo and tetrazo components used and the substituents $R_1$ and $R_2$ of the imidazoles used may also bear halogen atoms or alkyl, hydroxyalkyl, cyanoalkyl, aralkyl, hydroxyl, alkoxyl, nitro, cyano, primary, secondary or tertiary amino, acylamino, alkylsulfone, arylsulfone, carboxylic acid, carboxylic acid ester and/or—possibly substituted-carboxylic acid amide, sulfonic acid amide or arylazo groups. Examples of such azo components are ortho- and para-chloraniline, ortho- and parabromaniline, 2,5-dichloraniline, ortho- and para-methoxyaniline, 2,4- and 2,5-dimethoxyaniline, 2-methoxy-4-chloraniline, 2-nitro-4-methoxyaniline, 4-dimethylaminoaniline, 4-diethylaminoaniline, 2-ethoxy-4-dimethylaminoaniline, 4-N-bis-(2'-hydroxyethyl)-aniline, 4-N-bis-(2'-cyanoethyl-)aniline, 2-dimethylamino-5-nitroaniline, 4-phenylaminoaniline, 4-(2'-methoxy)-phenylaminoaniline and 4-(N-methyl-N-phenyl)-aminoaniline. Examples of imidazoles capable of coupling are imidazole itself and also 4-methyl-, 4-phenyl-, 4,5-dimethyl-, 4,5-diphenyl-, 4-methyl-5-phenyl-, 4,5-tetramethylene-, 4,5-pentamethylene-, 4-(4'-dimethylamino)-phenyl-, 5-phenyl- and 4-(4'-methoxy)-phenyl-5-phenyl-imidazole.

The alkylation of the mono or disazo dyestuffs is carried out with alkylating, cycloalkylating or aralkylating agents, as for example alkyl, aralkyl or cycloalkyl halides, such as methyl chloride, ethyl bromide, benzyl chloride, phenacyl chloride, and dialkyl sulfates or alkyl esters of aromatic sulfonic acids, such as dimethyl sulfate, toluene sulfonic acid methyl ester or toluene sulfonic acid (2-chlor)-ethyl ester. The alkylation can be carried out in aqueous solution or suspension or in organic solvents at normal or raised temperature. It is advantageous to work in the presence of acid-binding agents, such as alkali hydroxides, or alkaline earth oxides or carbonates. Simultaneously with the alkylation of the imidazole ring, groups containing substitutable hydrogen present in the initial material, such as hydroxyl, carboxylic acid or amino groups, may also be chemically changed, for example etherified, esterified, or alkylated. Finally, nitro groups contained in the quaternary salts formed can also be reduced or acylamino or ester groups can be hydrolyzed.

(B) Aromatic amino compounds of the general formula

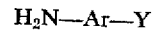

H$_2$N—Ar—Y in which Ar has the above meaning and Y is a substituent capable of being split off as an anion, as for example a halogen atom or an alkoxy, alkylthiol, sulfonic acid, alkylsulfonic or arylsulfonic acid ester group, are diazotized and coupled with imidazoles of the general formula given under (A) above. In this case also, the diazo components and the substituents $R_1$ and $R_2$ of the imidazoles may bear the groups specified under (A).

The alkylation of the monoazo or disazo dyestuffs thus prepared is carried out as described under (A), paragraph 2, with alkylating, aralkylating or cycloalkylating agents.

The quarternary dyestuff salts obtained can then if desired be reacted with primary or secondary amines of the general formula

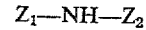

Z$_1$—NH—Z$_2$ in which $Z_1$ represents a hydrogen atom or free or substituted alkyl, cycloalkyl or aralkyl group and $Z_2$ represents a free or substituted alkyl or aryl radical and $Z_1$ and $Z_2$ both are members of a common isocyclic or heterocyclic ring, or with N-substituted carboxylic acid amides, e.g. dialkylformamides so that the said radical Y is split off as an anion and replaced by the radical of the amine or acid amide used. This reaction, surprisingly, proceeds very smoothly and is preferably carried out in aqueous solution, in general at ambient temperature. An addition of organic solvents or heating of the reaction mixture may be necessary for bringing about the reaction, especially when using water-insoluble or very weakly basic amines, for example many arylalkylamines. After the end of the reaction, which may readily be followed papyrographically, i.e. by paper chromatographic methods, the dyestuff formed is isolated in the usual way by acidification and salting out. It is especially advantageous to react the quaternary dyestuff salt which has been prepared in organic solvents, without isolation, with the said amines or N-substituted carboxylic acid amides which have already served as solvent in the alkylation of the azo dyestuff, preferably with the addition of acid-binding agents and at elevated temperature, whereby the amines or acid amides transfer the amino radical contained therein to the dyestuff salt. As compared with the process under (A), the process under (B) has the advantage that whereas under (A) N-substituted 1,2- or 1,4-diaminobenzene and -naphthalene derivatives which are sensitive to atmospheric oxygen and of which the diazo compounds sometimes have but little reactivity are used, there are used under (B) 2- and 4-halogenaniline or -alkoxyaniline derivatives and primary or secondary amines which are accessible in great number and are easy to handle. The smooth reaction described above is surprising because it is known that halogen atoms on non-activated aryl radicals are in general very firmly combined.

(C) Aromatic amino compounds of the general formula

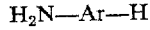

$$H_2N-Ar-H$$

in which Ar has the above meaning are diazotized and coupled with the imidazoles of the formula given under (A), and the diazo components used and the substituents $R_1$ and $R_2$ of the imidazoles may bear the groups specified under (A).

The alkylation of the monoazo or disazo dyestuffs thus prepared is carried out as described under (A), paragraph 2, with alkylating, aralkylating or cycloalkylating agents.

The quaternary dyestuff salts obtained are then reacted with primary or secondary aliphatic, araliphatic or heterocyclic, preferably non-aromatic, amines in the presence of oxidizing agents. Amines suitable for this purpose are for example: monomethylamine, dimethylamine, diethylamine, methyl-2-hydroxyethylamine, ethyl-2-cyanoethylamine, methyl-2-cyanoethylamine, 1-amino-3-methoxypropane, 1-methylamino-3-methoxypropane, N,N-dimethyl-1,3-diaminopropane, pyrrolidine, piperidine, hexamethylene imine, morpholine, piperazine, benzylamine or benzylmethylamine. The reaction of the quaternary dyestuff salts with the amines is carried out in aqueous or organic solution, for example in methanol, ethanol, acetone, formamide, dimethylformamide or simply in an excess of the amine as solvent, in general at ambient but also at elevated temperature. Suitable oxidizing agents are for example atmospheric oxygen, hydrogen peroxide, hypochlorites, persulfates, iron (III), copper (II), mercury (II), lead (IV) or cerium (IV) salts and hexacyano ferrates (III); if necessary, oxygen transferring catalysts, as for example heavy metals and their salts, may be coemployed. After the end of the reaction, which can readily be followed papyrographically, i.e. by paper chromatographic methods the product is acidified and any undesirable byproducts, as for example lead (II) salts, removed by precipitation in the form of carbonates, sulfates or sulfides. The dyestuff is then isolated from the filtrate in the usual way by salting out or by the production of less soluble salts. When the oxidation is effected with hexacyano ferrate (III), the dyestuff is obtained, by acidification as the less water-soluble hexacyano ferrate (II). It is especially advantageous to react the quaternary dyestuff salts prepared in water or organic solvents with the said amines without having been isolated.

The process described under (C) has the advantage as compared with that described under (A) that whereas under (A) N-substituted 1,2- or 1,4-diamino-benzene and -naphthalene derivatives are used which are sensitive to atmospheric oxygen and give diazo compounds which sometimes have little reactivity, under (C) there are used aminobenzenes unsubstituted in ortho- or para-position and primary and secondary amines all of which are accessible in large numbers and easy to handle. The smooth reaction described under (C) is surprising because it is known that hydrogen atoms on non-activated aryl radicals are in general very firmly combined.

The dyestuffs obtained by the methods described under (A) to (C) have the character of cationic or basic dyestuffs. Their anions may be any inorganic or organic anions, e.g. halogen, perchlorate, sulfate, methosulfate or alkylbenzene sulfonic acid ester anions; furthermore they can form double salts, e.g. with heavy metal salts as zinc chloride etc. They are more or less soluble in water depending on the nature of the anion associated therewith, and can be converted by reaction with suitable acids or acid dyestuffs into lacquer or pigment dyestuffs. When they have sufficient solubility in water they may be used for dyeing structures such as fibers, flocks, threads, foils or woven or knitted goods, for example from mordanted cotton, natural or synthetic polyamides, such as wool, silk, leather, polyhexamethylene diamine adipate or polycaprolactam or from other synthetic materials, such as cellulose esters or ethers, polyurethanes or polyesters; especially on materials of polyacrylonitrile or copolymers containing acrylonitrile, they yield dyeings or prints in very fast pure shades of good color strength by mass, spin or bath dyeing or printing.

The following examples will further illustrate this invention but the invention is not restricted to these examples. The parts specified are parts by weight.

*Example 1*

13.6 parts of 1-amino-4-dimethylaminobenzene are diazotised in known way and the resultant diazonium solution is coupled while cooling externally with a solution of 11 parts of 4,5-diphenylimidazole in 200 parts of pyridine and 100 parts of 10% aqueous sodium hydroxide solution. The azo dyestuff thus formed is completely precipitated by gradual addition of 1500 parts of water, filtered off, washed with water and dried.

The dark brown powder obtained is dissolved in 300 parts of dimethylformamide at 100° to 110° C. and 26 parts of dimethyl sulfate are added thereto at the same temperature. After reaction is complete, the reaction mixture is introduced into 3000 parts of water, and the quaternary dyestuff salt is precipitated by addition of 1000 parts of saturated sodium chloride solution. It is obtained after the usual working up as a dark brown-red powder which dissolves readily in water with an intense red-violet color and dyes structures of polyacrylonitrile from a weakly to strongly acid bath and fibers of acetylcellulose from a neutral or acetic acid bath in very fast red-violet shades.

The following azo dyestuffs can be converted in the same way into the corresponding quaternary dyestuffs which give for example on fibers containing acrylonitrile dyeings of the shades specified:

| Initial dyestuff | Shade of color |
|---|---|
| 1-amino-4-dimethylaminobenzene——→4-phenylimidazole. | Bordeaux. |
| 1-amino-4-dimethylaminobenzene——→imidazole. | Bluish-red. |
| 1-amino-4-dimethylaminobenzene——→4-phenyl-5-(4'-dimethylamino)-phenylimidazole. | Red-violet. |
| 1-amino-2-ethoxy-4-diethyl-aminobenzene——→4-phenyl-5-(4'-dimethylamino)-phenylimidazole. | Do. |
| 1-amino-2-ethoxy-4-diethyl-aminobenzene——→4,5-diphenylimidazole. | Do. |
| 1-amino-2-ethoxy-4-diethyl-aminobenzene——→4-phenylimidazole. | Bordeaux. |
| 1-amino-2-ethoxy-4-diethyl-aminobenzene——→imidazole. | Do. |
| 1-amino-4-[N-ethyl-N-(2-hydroxy)-ethyl]-aminobenzene——→imidazole. | Do. |
| 1-amino-4-[N-ethyl-N-(2-hydroxy)-ethyl]-aminobenzene——→4,5-diphenylimidazole. | Red-violet. |
| 1-amino-2, 4-dimethoxybenzene——→4,5-diphenylimidazole. | Orange. |
| 1-amino-4-ethoxybenzene——→4,5-diphenylimidazole. | Yellow. |
| 1-amino-4-acetylaminobenzene——→4.5-diphenylimidazole. | Yellow-orange (after hydrolysis of the acetylamino group: red). |
| 1-amino-2-dimethylamino-5-nitrobenzene——→4,5-diphenylimidazole. | Brown-red. |

Example 2

A solution of 7 parts of imidazole in 100 parts of 10% sodium hydroxide solution is allowed to flow slowly into the diazonium solution obtained from 15 parts of 1-amino-4-acetylaminobenzene in the usual way. The yellow dyestuff thereby separated is filtered off by suction and heated in 500 parts of 3.5% caustic soda solution under reflux until the splitting off of the acetyl group has been completed. 26 parts of dimethyl sulfate are then allowed to flow in at 0° to 5° C. with powerful stirring. After the end of the methylation, the product is acidified with hydrochloric acid, the dyestuff precipitated by addition of 1000 parts of saturated sodium chloride solution and 50 parts of 50% zinc chloride solution, in the form of its pale red zinc chloride double salt and worked up as usual. It dissolves in water with a scarlet color and dyes structures of polyacrylonitrile fast scarlet red shades from a weak to strong acid bath.

Dyestuffs with similar properties are obtained by using, instead of 1-amino-4-acetylaminobenzene, its 2,6- or 3,5-dichlor or 2,5-dimethoxy derivatives. The corresponding nitro derivatives of aminobenzene may also be used as diazo components, and if desired the nitro groups in the resultant azo dyestuffs or their quaternary salts may be reduced to amino groups. If, instead of the above-mentioned coupling component, there is used 4-methyl-, 4-phenyl, 4,5-dimethyl- or 4,5-diphenyl-imidazole, the shade of color of the quaternary salts thus obtained is displaced towards the red side of the spectrum as compared with that of the imidazole dyestuff.

Example 3

A solution of 7 parts of imidazole in 100 parts of water is added to a diazonium solution from 18.8 parts of 1-amino-2,4-dimethoxy-5-chlorobenzene and then 80 parts of 10% caustic soda solution are dripped in until the coupling is ended. The yellow azo dyestuff thereby deposited is filtered off by suction, washed with a little water and to the resultant paste there are added 4 parts of magnesium oxide and 26 parts of dimethyl sulfate at 0° to 5° C. After the methylation is ended, the quaternary dyestuff is precipitated in the form of the zinc chloride double salt from the yellow solution by addition of 1000 parts of water, 1000 parts of saturated sodium chloride solution and 50 parts of 50% zinc chloride solution, filtered off by suction and dried. It is obtained as a yellow-brown powder which dissolves readily in water with a yellow color and dyes structures of acrylonitrile-containing fibers fast yellow shades from a weak to strong acid bath.

From the following azo dyestuffs there may be obtained in the same way the quaternary salts which give on fibers containing acrylonitrile the shades specified:

| Initial dyestuff | Shade of color |
|---|---|
| 1-amino-2-methoxybenzene——→imidazole. | Greenish yellow. |
| 1-amino-4-methoxybenzene——→imidazole. | Yellow. |
| 1-amino-2,4-dimethoxybenzene——→imidazole. | Do. |
| 1-amino-2,4-dimethoxybenzene——→4,5-diphenylimidazole. | Orange. |
| 1-amino-2-methoxybenzene-5-sulfonic acid dimethylamide——→imidazole. | Yellow. |
| 1-amino-2-(N-methyl-N-phenyl)-amino-5-nitrobenzene——→imidazole. | Brownish-red. |
| 1-amino-4-acetylaminobenzene——→imidazole. | Yellow. |

Example 4

The diazonium solution obtained in a manner known per se from 24 parts of 4-amino-4'-dimethylamino-azobenzene is gradually added to a mixture of 7 parts of imidazole, 100 parts of water, 60 parts of 50% caustic soda solution and 200 parts of ice. The violet dyestuff thereby separated is filtered off by suction, washed with water and dried. Then it is added to a mixture of 3 parts of magnesium oxide and 500 parts of chloroform, 25 parts of dimethyl sulfate are added and the mixture heated to 40° to 50° C. until methylation is complete. The dyestuff practically insoluble in chloroform thus obtained is filtered off by suction and dried. It is obtained as a blue-black powder which dissolves in water with an intense blue coloration and dyes acrylonitrile-containing structures fast dark blue shades.

Dyestuffs with similar properties are obtained by using in the same manner the following compounds as diazo components:

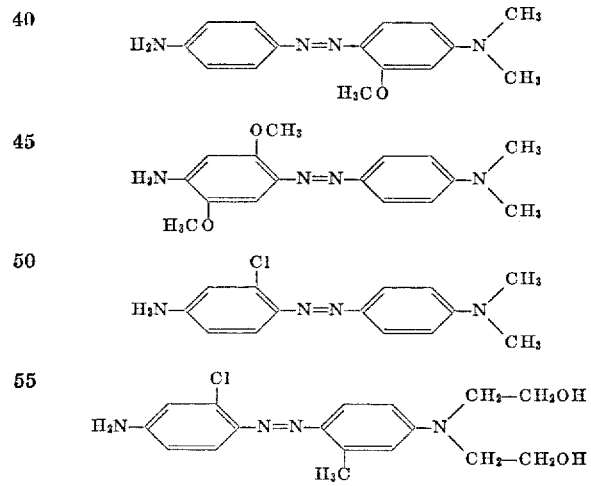

Example 5

The tetrazonium solution obtained in a manner known per se from 24,4 parts of 3,3'-dimethoxy-4,4'-diaminodiphenyl is allowed to flow gradually into a mixture of 14 parts of imidazole, 500 parts of water, 60 parts of 50% caustic soda solution and 200 parts of ice, the deposited dyestuff is filtered off by suction and washed with water. It is then stirred with 500 parts of water, 8 parts of magnesium oxide added and then 52 parts of dimethyl sulfate are gradually introduced and the quaternary salt precipitated by addition of 1000 parts of saturated sodium chloride solution and 15 parts of 50% zinc chloride solution, the salt thus being obtained as the zinc chloride double salt. The dried dyestuff gives an orange solution in water and dyes acrylonitrile containing fibers fast orange shades from a weak to strong acid bath.

By using 4,4'-diaminodiphenyl sulfide or 4,4'-diaminodiphenyl as the tetrazo component in the above method of operation, yellow dyeings of similar properties are obtained on acrylonitrile fibers.

*Example 6*

By methylating the monoazo dyestuff 1-amino-4-chlorbenzene→imidazole with 2 mols of dimethyl sulfate in chloroform at 50° C. in the presence of 1 mol of magnesium oxide and by evaporating the solvent in vacuo, there is obtained the yellow quaternary salt which consists of the cation of the formula

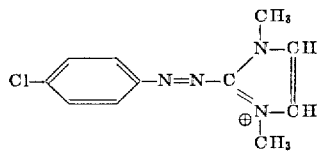

and the methosulfate anion. 22 parts of this dyestuff are made into a paste in a mortar with 8 parts of water, stirred with 30 parts of 40% aqueous dimethylamine solution and evaporated on the waterbath. The residue is taken up with 500 parts of water, acidified with the aid of 10 parts of acetic acid and, after the addition of 70 parts of 50% zinc chloride solution, the dyestuff is precipitated by saturating the solution with potassium chloride and isolated. It dyes polyacrylonitrile fibers fast red shades.

Similar dyestuffs are obtained by using diethylamine, methyl - 2 - hydroxyethylamine, bis - (2 - hydroxypropyl)-amine or butyl-2-hydroxyethylamine instead of dimethylamine.

*Example 7*

10 parts of the dyestuff of the formula specified in Example 6 are stirred as a dry powder during the course of 10 minutes into 40 parts of morpholine, the temperature thereby rising from 25° C. to 53° C. After a further 30 minutes, 100 parts of glacial acetic acid are allowed to flow in so gradually that the temperature of the mixture does not exceed 80° C. A deep red solution is obtained which is diluted with 2000 parts of water. After adding 300 parts of sodium chloride and 60 parts of 50% zinc chloride solution, a crystalline precipitate is obtained which is filtered off by suction and dried at 50° C. 12 parts of the dyestuff salt are thus obtained, the cation of which has the formula

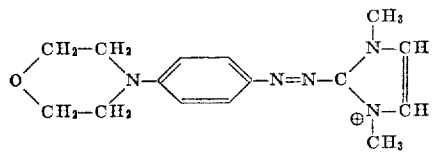

It dissolves in water with a red color and gives pure red dyeings of excellent fastness properties on acrylonitrile fibres.

By using, for example, thiomorpholine-S-dioxide, pyrrolidine, piperidine or hexamethylene imine instead of morpholine, bluish-red dyestuff salts are obtained.

*Example 8*

The monoazo dyestuff 1-amino-4-chlor-2,5-dimethoxybenzene→imidazole is dissolved at 50° C. in chloroform and methylated with 2 mols of dimethyl sulfate in the presence of 1 mol of magnesium oxide. After evaporating the chloroform, the residue is dissolved in water and the dyestuff salt is precipitated as the zinc chloride double salt and dried. 17 parts of the resultant yellow dyestuff, the cation of which has the formula

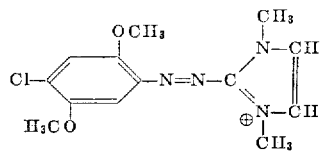

are stirred into 100 parts of ethanol and 30 parts of piperidine are added. Deepening of color and rise in temperature from 23° C. to 32° C. take place. After two hours, the reaction mixture is poured into a mixture of 30 parts of glacial acetic acid and 1,000 parts of water and then 50 parts of 50% aqueous zinc chloride solution and 250 parts of sodium chloride are added. The deposited dyestuff is filtered off by suction and dried at 50° C. in vacuo. It is obtained in a yield of 16 parts, dissolves in water with a bluish-red color and dyes fibers containing acrylonitrile clear red-violet shades of very good fastness properties.

By using morpholine, thiomorpholine-S-dioxide or pyrrolidine instead of piperidine, bluish-red dyestuffs are obtained in the same way; by using N-methylaniline, heating at 80° C. for several hours is necessary, and a dyestuff salt is formed which dyes acrylonitrile-containing material violet shades.

*Example 9*

17 parts of the dyestuff salt obtained from the monoazo dyestuff 1-amino-4-methoxybenzene→imidazole as described in Example 8 and the cation of which has the formula

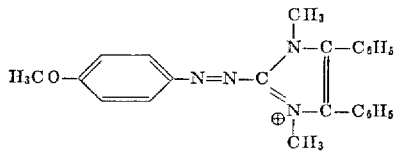

and which dyes polyacrylonitrile in reddish-yellow shades, are stirred into a mixture of 30 parts of methanol and 20 parts of pyridine. 30 parts of piperidine are added and the whole stirred for several hours at normal temperature. After the end of the reaction, the reaction mixture is introduced into a mixture of 1,000 parts of water and 30 parts of concentrated hydrochloric acid, and the dyestuff formed is precipitated by addition of 10 parts of zinc chloride and 300 parts of saturated sodium chloride solution. After filtration by suction and drying at 50° C., it is obtained in a yield of 19 parts; on polyacrylonitrile fibers it gives clear red-violet dyeings of excellent fastness properties.

*Example 10*

50 parts of the azo dyestuff of the formula

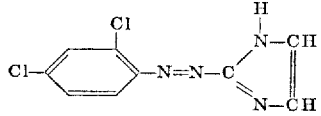

are stirred with 200 parts of dimethyl formamide. After adding 12 parts of finely powdered magnesium oxide, 65 parts of dimethyl sulfate are allowed to flow in at 60° C. and the mixture heated for 8 hours in a boiling waterbath, whereby the dimethylamine split off from the solvent reacts with the chlorine atom in 4-position to the azo group with the formation of a red dyestuff. The reaction mixture is then allowed to cool, diluted with 1,500 parts of water and the dyestuff salt deposited by addition of sodium chloride and zinc chloride is worked up as usual. It dissolves in water with a red color and dyes acrylonitrile-containing fibers yellowish-red shades.

Further dyestuff salts are obtained in the same way from the following components:

50 parts of 30% acetic acid; finally 200 parts of saturated sodium sulfate solution are added, the precipitate formed

| Azo dyestuff reacted with dimethyl sulfate | Amino component | Shade of color on polyacrylonitrile fibers |
|---|---|---|
| 1-amino-4-chlorobenzene⟶4-phenylimidazole | Pyrrolidine | Bluish-red. |
|  | Piperidine | Bordeaux. |
| 1-amino-2-chlorobenzene⟶imidazole | Methylamine | Red-orange. |
|  | Morpholine | Scarlet-red. |
|  | Pyrrolidine | Red. |
| 1-amino-2,4-dimethoxybenzene⟶imidazole | Diethylamine | Yellowish-red. |
|  | Bis-(2-hydroxyethyl)-amine | Do. |
|  | Pyrrolidine | Red. |
| 1-amino-4-ethoxybenzene⟶imidazole | Piperidine | Bluish-red. |
|  | Bis-(2-cyano)-ethylamine | Orange. |
| 1-amino-2-methoxybenzene⟶imidazole | Morpholine | Red. |
| 1-amino-2,4-dichlorobenzene⟶imidazole | ___do___ | Red. |
| 1-amino-3,4-dichlorobenzene⟶imidazole | ___do___ | Red. |
| 1-amino-2-methoxy-4-chlorobenzene⟶4,5-diphenyl-imidazole | ___do___ | Yellowish-red. |
| 1-amino-4-chlorobenzene⟶4,5-tetramethylene-imidazole | Pyrrolidine | Red-violet. |
| 1-amino-2-chloro-4-ethylsulfonyl-benzene⟶imidazole | Piperidine | Red-brown. |
| 1-amino-4-bromonaphthalene⟶imidazole | Morpholine | Red-violet. |
|  | Piperidine | Blue-violet. |
|  | Methylamine | Red-orange. |
|  | 1-amino-3-methoxy-propane | Do. |
|  | Benzylamine | Red. |
| 1-amino-4-chlorobenzene⟶imidazole | Cyclohexylamine | Red. |
|  | N,N-dimethyl-1,3-diaminopropane | Red. |
|  | Dipropylene triamine | Red. |
|  | Piperazine | Scarlet-red. |
|  | Aminobenzene | Bordeaux. |
|  | 1-amino-4-acetyl-aminobenzene | Red violet. |
|  | 1-amino-2,4-dimethoxybenzene | Violet. |
| 1-amino-4-chloro-2,5-dimethoxybenzene⟶imidazole | 4-aminodiphenylamine | Blue-violet. |
|  | 3-methoxy-4-aminodiphenyl | Blue-grey. |
|  | Piperidine | Violet. |
|  | Dimethylamine | Red-violet. |
|  | Methyl-(betahydroxyethyl)-amine | Red-violet. |
|  | Aminobenzene | Violet. |
| 1-amino-4-chlor-2,5-dimethoxybenzene⟶4,5-diphenylimidazole | 1-amino-4-ethoxybenzene | Blue-violet. |
|  | 1-amino-2,4-dimethoxybenzene | Navy blue. |
|  | 1-amino-4-diethylaminobenzene | Blue-grey. |
|  | 2-methyldihydroindole | Violet. |

*Example 11*

17 parts of the quaternary salt which has been obtained according to Example 8 from the monoazo dyestuff 1-amino-4-chlor-2,5-dimethoxybenzene→imidazole, together with 8.5 parts of sodium acetate and 15 parts of 1-amino-4-methoxybenzene are heated to boiling for about three hours until the initial dyestuff can no longer be detected. The alcoholic solution is diluted with 1500 parts of water, acidified with 30 parts of 10-normal hydrochloric acid and the dyestuff formed is precipitated with 15 parts of zinc chloride and 250 parts of saturated sodium chloride solution. The product is filtered off by suction, washed on the filter with 5% sodium chloride solution and dried at 50° C. in vacuo. Its cation has the formula:

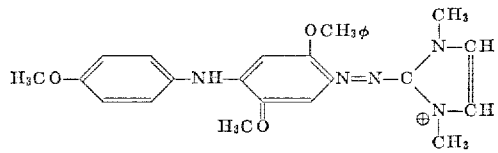

and it dyes polyacrylonitrile in very fast red-violet shades.

*Example 12*

A solution of 10 parts of imidazole in 150 parts of water is gradually added to the diazonium solution obtained in the usual way from 9.3 parts of aminobenzene, and then 60 parts of 10% caustic soda solution are added while cooling externally. After the end of the coupling, neutralization is effected with 15 parts of 30% acetic acid and the deposited yellow azo compound is filtered off by suction. It is stirred, without drying, with 250 parts of water. Then 10 parts of magnesium oxide, 250 parts of ice and, with simultaneous cooling externally, 32 parts of dimethyl sulfate are gradually added. When the methylation has ended, any excess of magnesium oxide present is filtered off, 30 parts of lead (IV) oxide and 50 parts of piperidine are added to the filtrate and the reaction mixture is stirred at room temperature until the initial dyestuff can no longer be detected. It is then acidified with 50 parts of 30% acetic acid; finally 200 parts of saturated sodium sulfate solution are added, the precipitate formed is separated from lead compounds, the dyestuff is precipitated from the filtrate by the addition of 20 parts of 50% zinc chloride solution and 1000 parts of saturated sodium chloride solution and dried. It is obtained as a violet powder with a bronze luster which dissolves in water with a bluish-red color and dyes polyacrylonitrile material in bluish-red shades of good fastness properties.

Cationic dyestuffs may also be prepared in an analogous way using the following components:

| Diazo components | Coupling components | Amino components | Shade of color of dyeings |
|---|---|---|---|
| Aminobenzene | Imidazole | Pyrrolidine | Blue-red. |
| Do | ___do___ | Dimethylamine | Do. |
| 1-amino-2-nitrobenzene | ___do___ | Piperidine | Do. |
| Do | ___do___ | Morpholine | Red. |
| 1-amino-3-methoxybenzene | ___do___ | Pyrrolidine | Violet. |
| 1-amino-2,5-dimethoxy-benzene | ___do___ | ___do___ | Red-violet. |

*Example 13*

The monoazo dyestuff aminobenzene→imidazole is methylated as in Example 12 with dimethyl sulfate in the presence of magnesium oxide, and after precipitation with zinc chloride and sodium chloride, the product is isolated and dried.

A solution of 16 parts of the dyestuff thus obtained the cation of which has the formula:

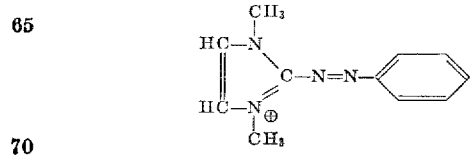

in 30 parts of water is added to 100 parts of pyrrolidine and 50 parts of a 10% aqueous hydrogen peroxide solution. The mixture is stirred at room temperature until the reaction has ended and then allowed to flow with external cooling into a mixture of 100 parts of glacial acetic acid and 3000 parts of saturated sodium chloride solution. By adding 50 parts of 50% zinc chloride solution, the dyestuff is precipitated as the zinc chloride double salt, filtered off by suction and dried. It is obtained in the form of a dark powder with a bronze luster which dissolves in water with a bluish-red color and dyes acrylonitrile fibers from a sulfuric acid bath in bluish-red shades of good fastness properties.

Corresponding dyestuffs can be prepared by using the following components:

| Diazo component | Coupling component | Amines | Shade of color of the dyeings |
|---|---|---|---|
| Aminobenzene | Imidazole | Piperdine | Bluish-red. |
| Do | do | Pyrrolidine | Do. |
| Do | do | Benzylamine | Red. |

*Example 14*

The monoazo dystuff 1-amino-2-nitrobenzene→imidazole is dissolved in chlorobenzene and methylated at 100° C. with 2 mols of diethyl sulfate in the presence of 1 mol of magnesium oxide. The dyestuff salt, after being isolated and freed from solvent, is dissolved in water, precipitated with zinc chloride, isolated and dried.

To a solution of 14 parts of the dyestuff thus obtained, the cation of which has the formula:

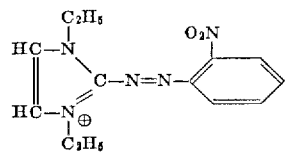

in 400 parts of water, there are added in one batch 17 parts of piperidine and then 110 parts of a 1-molar solution of potassium hexacyanoferrate (III) are allowed to flow in gradually. The separation of the dyestuff present as hexacyanoferrate (II) is completed by addition of 50 parts of 30% acetic acid. After filtration by suction, washing with a little water and drying, the dyestuff is obtained as a dark red powder which dissolves in hot water with a bluish-red color and gives fast bluish-red dyeings on polyacrylonitrile fibers from an acetic acid bath.

The following dyestuffs can be prepared in a corresponding way:

| Diazo components | Coupling component | Amines | Shade of color of the dyeings |
|---|---|---|---|
| 1-amino-3-methyl-benzene | Imidazole | Piperidine | Bluish-red. |
| Aminobenzene | do | do | Do. |
| Do | do | Diethylamine | Do. |

*Example 15*

A fabric of polyacrylonitrile staple fiber is introduced at 60° C. into a dyebath which contains 5 parts of 30% acetic acid, 10 parts of Glauber's salt and 0.6 part of the dyestuff of the formula:

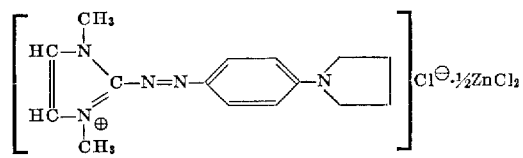

in 4000 parts of water, and the temperature is raised to 85° C. in the course of 15 minutes. The bath is brought to boiling temperature within 30 minutes and dyeing continued for 90 minutes in the boiling bath. The fabric is then soaped, rinsed and dried. The fiber is dyed in a full bluish-red shade of excellent fastness to light, washing and fulling.

The same result is obtained when a fabric of a copolymer of 95% of acrylonitrile and 5% of butyl methacrylate is used.

*Example 16*

100 parts of fibers of a copolymer of 40 parts of acrylonitrile and 60 parts of vinyl chloride are dyed at 85° C. in a dyebath which contains in 3000 parts of water, 5 parts of 30% acetic acid, 3 parts of the condensation product of 1 mol of sperm oil alcohol with 24 mols of ethylene oxide and 0.4 part of the dyestuff of the formula:

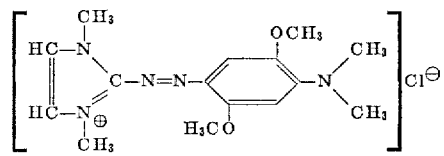

The fibrous material is dyed red-violet; the dyeing is extremely fast to light and wet treatments.

We claim:

1. A process for the production of a cationic dyestuff which comprises reacting a compound of the formula:

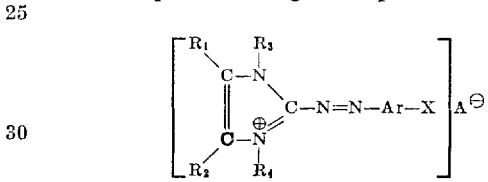

in which each of $R_1$ and $R_2$ represents a member selected from the group consisting of hydrogen and phenyl, each of $R_3$ and $R_4$ represents lower alkyl.

Ar represents a divalent benzene radical,

X represents a member selected from the group consisting of chlorine, ethoxy and methoxy in one of the positions ortho- and para- to the azo group and $A^\ominus$ represents an anion, with an amine of the formula:

wherein $R_5$ represents a member selected from the class consisting of hydrogen, methyl, ethyl, hydroxyethyl, hydroxypropyl, and cyanoethyl, $R_6$ represents a member selected from the class consisting of an alkyl group with 1 to 4 carbon atoms, hydroxyethyl, hydroxypropyl, methoxypropyl, dimethylaminopropyl, cyanoethyl, aminopropylaminopropyl, benzyl, cyclohexyl, phenyl, 4-methoxyphenyl, 4-ethoxyphenyl, 4-phenylaminophenyl, 4-diethylaminophenyl and 2,4-dimethoxyphenyl, and wherein $R_5$, $R_6$ and NH when taken together to form a heterocyclic amine represent a member selected from the class consisting of pyrrolidine, piperidine, morpholine, thiomorpholine-S-dioxide, piperazine and 2-methyldihydroindole.

2. The process for the production of a cationic dyestuff which comprises reacting dimethylamine with the compound of the formula:

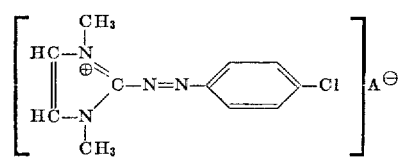

wherein $A^\ominus$ represents an anion.

3. The process for the production of a cationic dyestuff which comprises reacting piperidine with the compound of the formula:

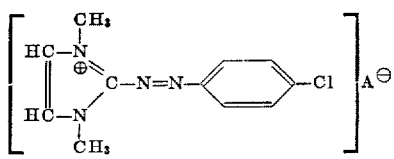

wherein $A^\ominus$ represents an anion.

4. The process for the production of a cationic dyestuff which comprises reacting pyrrolidine with the compound of the formula:

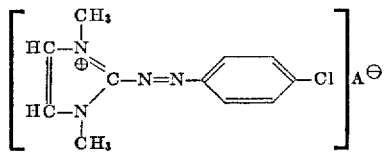

wherein $A^\ominus$ represents an anion.

5. The process for the production of a cationic dyestuff which comprises reacting pyrrolidine with the compound of the formula:

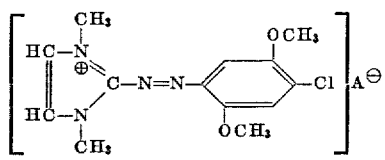

wherein $A^\ominus$ represents an anion.

6. The process for the production of a cationic dyestuff which comprises reacting 1-amino-2,4-dimethoxybenzene with the compound of the formula:

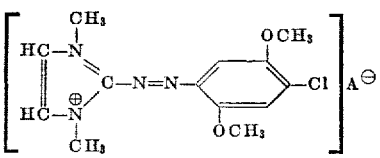

wherein $A^\ominus$ represents an anion.

References Cited in the file of this patent

UNITED STATES PATENTS 2,883,373    Bossard    Apr. 21, 1959

FOREIGN PATENTS 556,218    Canada    Apr. 22, 1958

OTHER REFERENCES

Taylor and Baker: "Sidgwick's Org. Chem. of Nitrogen," 1949, page 48, paragraph 2.

UNITED STATES PATENT OFFICE
CERTIFICATE OF CORRECTION

Patent No. 3,102,879                      September 3, 1963

Hans Baumann et al.

It is hereby certified that error appears in the above numbered patent requiring correction and that the said Letters Patent should read as corrected below.

Column 2, line 20, for "(2'-cyanoethyl-)" read -- (2'-cyanoethyl)- --; column 9, lines 50 to 56, for that portion of the formula reading $OCH_{3\phi}$      read      $OCH_3$ column 14, lines 5 to 11, for that portion of the formula reading

Signed and sealed this 2nd day of June 1964.

(SEAL)
Attest:

ERNEST W. SWIDER  
Attesting Officer

EDWARD J. BRENNER  
Commissioner of Patents